United States Patent [19]

Suzuki et al.

[11] Patent Number: 5,200,074
[45] Date of Patent: Apr. 6, 1993

[54] ION-EXCHANGE APPARATUS HAVING ROTATABLE CARTRIDGES

[75] Inventors: Akira Suzuki; Shoichi Matsuda; Masafumi Ogata, all of Tokyo; Takanobu Inoue; Kimiaki Yasuda, both of Fukui, all of Japan

[73] Assignee: Kirin Beer Kabushiki Kaisha, Tokyo, Japan

[21] Appl. No.: 771,990

[22] Filed: Oct. 8, 1991

[30] Foreign Application Priority Data

Oct. 9, 1990 [JP] Japan .................. 2-271599

[51] Int. Cl.[5] .................................. B01D 24/32
[52] U.S. Cl. ........................ 210/267; 210/291; 210/325
[58] Field of Search ............... 210/282, 287, 325, 329, 210/330, 331, 345, 347, 370, 267, 291

[56] References Cited

U.S. PATENT DOCUMENTS

| | | | |
|---|---|---|---|
| 2,289,925 | 7/1942 | Munson | 210/325 |
| 2,617,986 | 11/1952 | Miller | 183/4.6 |
| 3,491,887 | 1/1970 | Maestrelli | 210/330 |
| 4,683,062 | 7/1987 | Krovák et al. | 210/267 |

FOREIGN PATENT DOCUMENTS

| | | |
|---|---|---|
| 1223346 | 8/1966 | Fed. Rep. of Germany . |
| 2236775 | 7/1974 | Fed. Rep. of Germany . |
| 2574004 | 6/1986 | France . |

OTHER PUBLICATIONS

Patent Abstract of Japan vol. 5, No. 31 (C-45) (703) Feb. 1981 & JP-A-55 157 331 (Mitsubishi) Dec. 8, 1990.

Primary Examiner—Matthew O. Savage
Attorney, Agent, or Firm—Armstrong, Westerman, Hattori, McLeland & Naughton

[57] ABSTRACT

An apparatus for separating a component from a liquid is disclosed herein. The apparatus includes a plurality of cartridges disposed within a tank, the cartridges being mounted on a support member rotatable about a first axis, and each cartridge being rotatable about a second axis parallel to the first axis. The cartridges include a plurality of holes on an outer periphery thereof, and contain a supply of a granular ion exchange material capable of separating a desired component from the liquid. Means are provided for transferring liquid to be separated into the tank, and to discharge treated liquid from the cartridges to a location outside the tank.

5 Claims, 3 Drawing Sheets

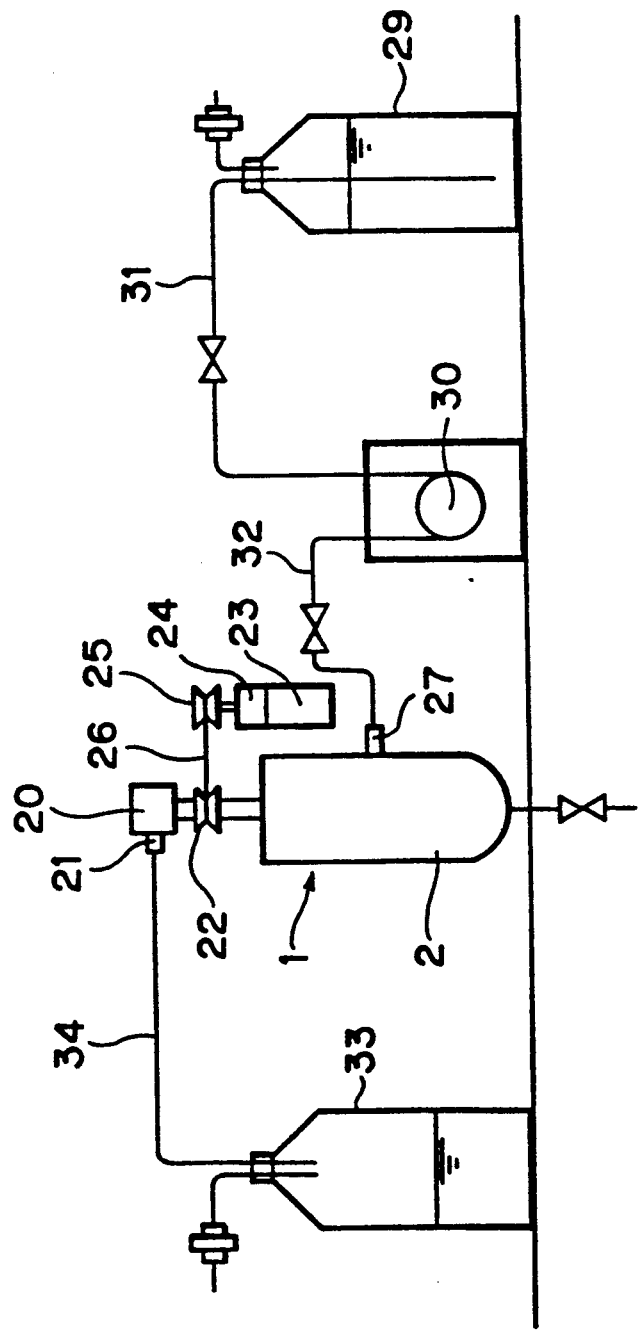

ION-EXCHANGE APPARATUS HAVING ROTATABLE CARTRIDGES

BACKGROUND OF THE INVENTION

1. Field of the Invention

The present invention relates to an apparatus for separating and purifying material, and more particularly to an apparatus for separating and purifying material which is preferably used to absorb certain material such as pigment or proteins and separate the same using a carrier comprising an ion exchanger or the like.

2. Description of Related Art

Conventionally, there is known an apparatus for separating and purifying material which comprises a stationary column filled with granular ion exchangers. In the conventional apparatus, crude solution is supplied from the lower portion of the column and passes between the ion exchangers, thereafter treated solution is discharged from the upper portion of the column. While crude solution passes between stationary ion exchangers filling the column, certain material in the crude solution is adsorbed and separated.

According to the above apparatus, since the ion exchangers are stationary, low frequency of contacts between material in the crude solution and the ion exchangers occurs, thus lowering efficiency of adsorbing and separating certain material.

In order to eliminate the above drawbacks, there has been used an apparatus which is provided with a stirrer for fluidizing the ion exchangers in the stationary column.

However, in the apparatus having the stirrer, crude solution is not sufficiently brought in contact with the ion exchangers because the crude solution does not flow uniformly to thus cause short pass. Further, the ion exchangers are damaged due to fluidity thereof.

SUMMARY OF THE INVENTION

It is therefore an object of the present invention to provide an apparatus for separating and purifying material which can enhance the frequency of contacts between material in the crude solution and the ion exchangers, thereby improving efficiency of adsorbing and separating certain material in the crude solution.

According to the present invention, there are provided a plurality of cartridges in a tank, the cartridges are filled with carriers such as ion exchangers, the cartridge is formed on its outer periphery with a plurality of holes for allowing crude solution to flow into the cartridge, passage means is provided to discharge treated solution from the cartridge, and the cartridge is rotatable around a central axis of the tank.

With the above structure, crude solution flows uniformly between the carriers to thus enhance the frequency of contacts between material in the crude solution and the ion exchangers, therefore certain material in the crude solution is uniformly adsorbed by the carriers and the efficiency of adsorbing and separating material can be improved.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

In the drawings:

FIG. 4 is an explanatory view showing an example of usage of the apparatus for separating and purifying material according to the embodiment of the present invention.

DETAILED DESCRIPTION OF THE INVENTION

An apparatus for separating and purifying material according to the present invention will be described below with reference to FIGS. 1 through 4.

Figure 1:
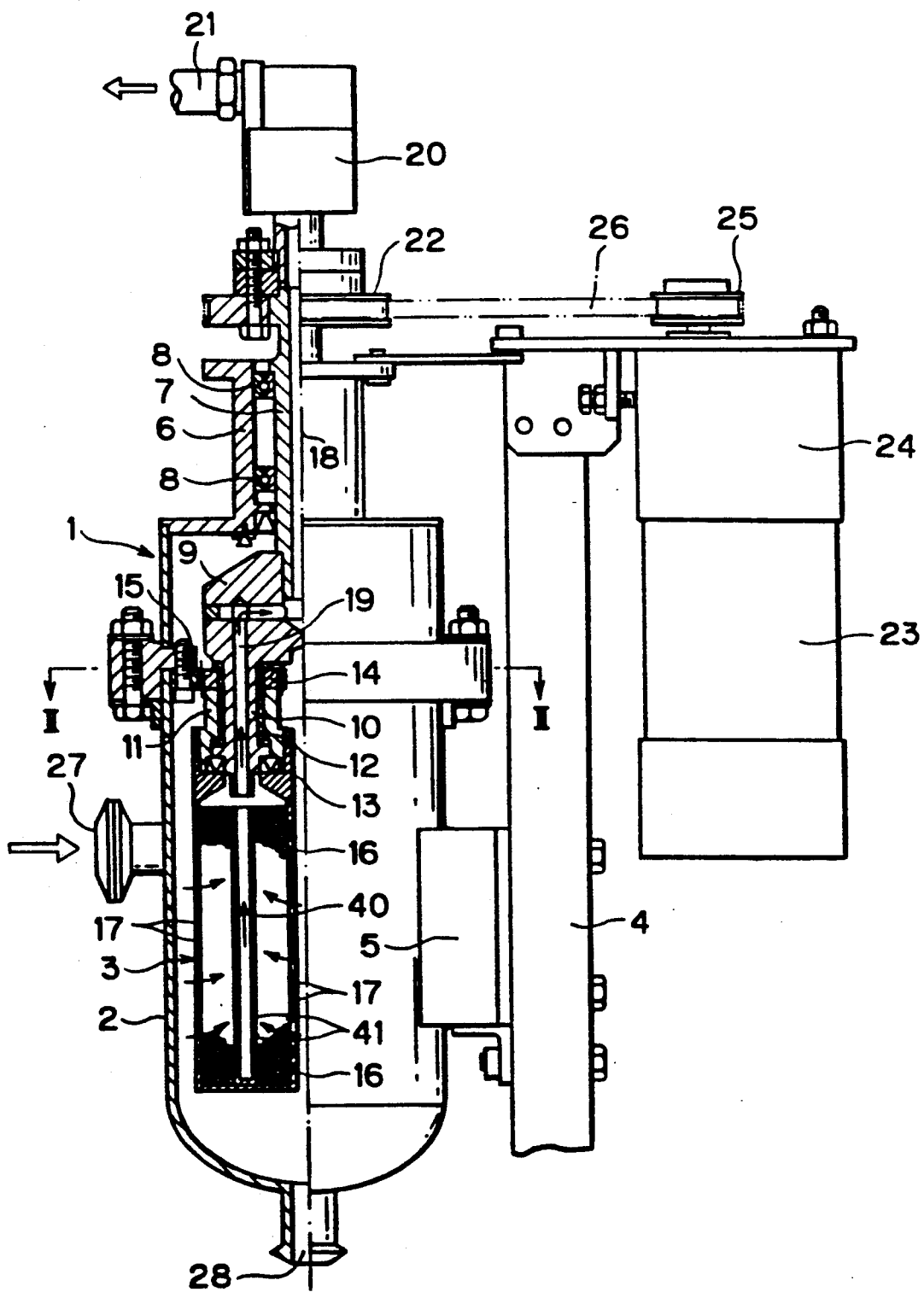
FIG. 1 is a schematic cross-sectional view showing an apparatus for separating and purifying material according to an embodiment of the present invention.

An apparatus for separating and purifying material 1 comprises a tank 2 having an enclosed structure and a plurality of cartridges 3 (three cartridges in the embodiment) filled with carriers as shown in FIG. 1. The cartridges 3 are rotatable around a central axis of the tank 1 and on its own axis.

The tank 2 is vertical type in the embodiment, that is, the tank 2 is supported in a vertical position by a main post 4 through a supporting member 5. The tank 2 is integrally provided with a bearing portion 6 at an upper portion thereof. A main shaft 7 is rotatably supported by radial bearings 8, 8 in the bearing portion 6. The main shaft 7 has a lower end which projects into the tank 2 and is connected to a cartridge supporting member 9. The cartridge supporting member 9 is provided at a lower portion thereof with three shaft portions 10 which are circularly arranged. A bearing portion 11 provided on the upper portion of the cartridge 3 is rotatably and watertightly supported by the shaft portion 10 through a bush 12 and a sealing member 13.

Figure 2:
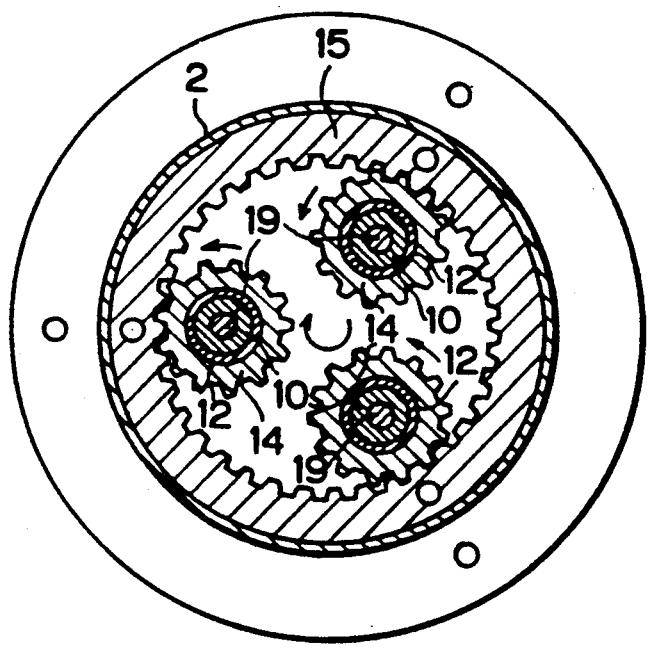
FIG. 2 is a cross-sectional view taken along line II—II of FIG. 1

A planet gear 14 is fixedly secured to the bearing portion 11. The planet gear 14 is engaged with an internal gear 15 which is disposed along the inner periphery of the tank 2 as shown in FIG. 2. With this structure, when the main shaft 7 is rotated, the cartridge 3 is rotated around an axis of the main shaft 7 (a first axis) and around an axis of the shaft portion 10 (a second axis). In other words, the cartridge 3 revolves both round the first axis and on its axis (the second axis).

Figure 3:
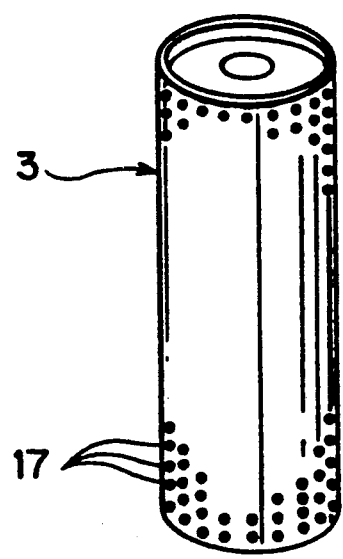
FIG. 3 is a perspective view showing a cartridge incorporated in the apparatus for separating and purifying material according to the embodiment of the present invention.

The cartridge 3 has a cylindrical shape as shown in FIG. 3, the cartridge 3 is filled with granular carriers 16 such as ion exchangers. A number of through holes 17 are formed on the outer periphery of the cartridge 3. The inside diameter of the through hole 17 is smaller than the outside diameter of the carrier 1.

A passage 18 is provided inside the main shaft 7, and the passage 18 is communicated with a passage 19 formed in the shaft portion 10 as shown in FIG. 1. On the other hand, a pipe 40 having a number of holes 41 on its outer periphery is incorporated in the cartridge 3. The pipe 40 has an enclosed bottom end and an open upper end which is in confrontation with the lower end of the shaft portion 10. As a result, the inside of the pipe 40 is communicated with the passage 19.

Further, the passage 18 is communicated with an outlet pipe 21 through a rotary joint 20. A pulley 22 is attached to the main shaft 7 protruding from the bearing portion 6. A timing belt 26 is provided between the pulley 22 and a pulley 25 driven by a motor unit 23 having a gear head 24, whereby the main shaft 7 is rotated by the motor unit 23 whose rotating speed is variable. The tank 2 is provided with an inlet 27 at its side and a drain 28 at its bottom.

FIG. 4 shows an example of usage of the apparatus for separating and purifying material according to the embodiment of the present invention.

A reservoir tank 29 for reserving crude solution is connected to a pump 30 through a pipe 31 with a valve. The pump 30 is connected to the inlet 27 of the tank 2 through a pipe 32 with a valve. The outlet 21 is connected to a recovery tank 33 for recovering treated solution through a pipe 34.

Next, operation of the embodiment in FIG. 4 will be described below. The crude solution is supplied from the reservoir tank 29 to the tank 2 by the pump 30, thereby enabling the crude solution to fill the tank 2. At this time, the motor unit 23 is rotated, the main shaft 7 is rotated through the pulley 25, the timing belt 26 and the pulley 22 (see FIG. 1).

When the main shaft 7 is rotated, the cartridge supporting member 9 is rotated together with the main shaft 7, whereby the cartridges 3 supported by the cartridge supporting member 9 are rotated around the first axis. Simultaneously, the cartridges 3 revolve on their own axes (the second axes) because the planet gears 14 are engaged with the internal gear 15. Therefore, since each cartridge 3 revolves both round the first axis and on its own axis in the crude solution in the tank 2, the crude solution flows into the inside of the cartridge 3 through the through holes 17 on the outer periphery of the cartridge 3. Thereafter, the crude solution passes through the clearance between the carriers 16 and flows into the pipe 40 through the holes 41, and then the treated solution is taken out from the outlet 21 through the passage 19 of the cartridge supporting member 9, the passage 18 of the main shaft 7 and the rotary joint 20. At this time, the cartridge 3 is rotated around the first axis and on its own axis in the crude solution, so that the crude solution forcibly flows into the cartridge 3 and is uniformly dispersed among the carriers 16. Consequently, the crude solution is brought in contact with all the carriers 16, thus enhancing efficiency of adsorbing and separating objective material in the crude solution.

By selecting rotational speed of the motor unit 23 in accordance with a kind or property of the crude solution, or a kind of carrier, optimum stirring speed of the cartridge 3 is obtainable. Further, the stagnation time of the crude solution in the tank 2 is adjustable in an optimum state by controlling flow rate of the crude solution. The apparatus for separating and purifying material 1 is applicable to both the continuous type of separation and purification and the batch type of separation and purification.

In the embodiment, although there are provided three cartridges 3, the number of cartridges can be changed in accordance with the scale of the apparatus. Further, the apparatus can be installed in a lateral position as well as a vertical position. Furthermore, although the ion exchanger is employed as a carrier in the embodiment, the carrier can be suitably selected, thereby enabling desirable material to selectively separate and purify from the crude solution.

Although certain preferred embodiments have been shown and described, it should be understood that many changes and modifications may be made therein without departing from the scope of the appended claims.

What is claimed is:

1. An apparatus for separating a component from a liquid, the apparatus comprising:

A tank having an enclosed structure and an inlet for said liquid;

a cartridge supporting member provided in said tank, said cartridge supporting member being rotatable around a first axis positioned at a substantially central position of said tank;

first driving means for rotating said cartridge supporting member;

coupling means for coupling said driving means to said cartridge supporting member;

a plurality of cartridges supported by said cartridge supporting member, each said cartridge containing therein a supply of a granular ion exchange material capable of separating a component from said liquid, and each said cartridge having a number of holes at an outer periphery thereof for introducing said liquid into a respective said cartridge to contact said ion exchange material contained therein;

passage means for causing treated solution to flow from said cartridges to the outside of said tank;

wherein each said cartridge is supported by said cartridges supporting member so that said cartridge is rotatable around a second axis spaced away from said first axis and parallel to said first axis; and second driving means for rotating each said cartridge around said second axis, wherein each said cartridge is rotated around said second axis when said cartridge supporting member is rotated around said first axis.

2. The apparatus for separating a component from a liquid according to claim 1, wherein said cartridge supporting member is provided with a shaft which is rotatably supported by a bearing portion of said tank, and wherein said shaft is connected to said driving means.

3. The apparatus for separating a component from a liquid according to claim 2, wherein said passage means comprises a first passage provided in said cartridge supporting member and communicating with an interior of said cartridges, a second passage provided in said shaft and a rotary joint connecting said second passage with an outlet at an end of said tank.

4. The apparatus for separating a component from a liquid according to claim 1, where said second axis is positioned on an axis of said cartridge.

5. The apparatus for separating a component from a liquid according to claim 1, wherein each said cartridge is provided with a planet gear, said planet gear is engaged with an internal gear disposed along an inner periphery of said tank.

* * * * *

UNITED STATES PATENT AND TRADEMARK OFFICE
CERTIFICATE OF CORRECTION

PATENT NO. : 5,200,074
DATED : April 6, 1993
INVENTOR(S) : Suzuki et al

It is certified that error appears in the above-indentified patent and that said Letters Patent is hereby corrected as shown below:

On title page, item [73] add the following assignee:
--Sakai Engineering Co., Ltd., Fukui-shi, Japan--.

Signed and Sealed this

Eighteenth Day of October, 1994

Attest:

BRUCE LEHMAN

Attesting Officer

Commissioner of Patents and Trademarks